United States Patent Office 2,763,646
Patented Sept. 18, 1956

2,763,646
KETONES CONTAINING AN ARYLBENZO-THIAZOLE NUCLEUS

Leslie G. S. Brooker and Lewis L. Lincoln, Rochester, N. Y., assignors to Eastman Kodak Company, Rochester, N. Y., a corporation of New Jersey No Drawing. Application March 29, 1954, Serial No. 419,598

3 Claims. (Cl. 260—240)

This invention relates to ketones containing an arylbenzothiazole nucleus and a method for making them.

Ketones containing a benzothiazole nucleus have been previously described in the art. In the new ketones of our invention the benzothiazole nucleus has substituted thereon an aryl group. The new compounds of our invention have been found to be especially useful in preparing optical sensitizing dyes characterized by strong sensitizing action.

It is, therefore, an object of our invention to provide new ketone compounds and a method for making them. Another object is to provide sensitizing dyes of the carbocyanine type from these new ketone compounds. Still another object is to provide photographic emulsions sensitized with such carbocyanine dyes obtained from the new ketone compounds of our invention. Other objects will become apparent from the following description and examples.

The new ketone compounds of our invention can advantageously be represented by the following general formula:

I.

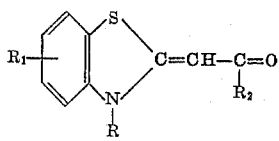

wherein R represents an alkyl group, such as methyl, ethyl, n-propyl, n-butyl, β-hydroxyethyl, benzyl (phenylmethyl), etc. (e. g. a primary alkyl group containing from 1 to 4 carbon atoms), and $R_1$ and $R_2$ each represents an aryl group, such as phenyl, o-, m-, and p-tolyl, o-, m-, and p-chlorophenyl, etc. (e. g. a monocarbocyclic aromatic group of the benzene series). The compounds of Formula I wherein $R_1$ is a 5-phenyl group and $R_2$ is a phenyl group have been found to provide especially useful results according to our invention.

The compounds of Formula I can advantageously be prepared by condensing together in the presence of an acid-binding agent a compound selected from those represented by the following general formula:

II.

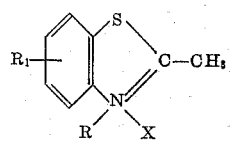

wherein R and $R_1$ each have the values given above, and X represents an acid radical, such as chloride, bromide, iodide, p-toluene-sulfonate, ethylsulfate, methylsulfate, etc., with an acid halide (e. g. chloride, bromide, etc.) having the following general formula:

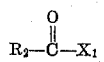

wherein $R_2$ has the values given above and $X_1$ represents a halogen atom. Typical acid-binding agents comprise pyridine, the picolines, quinoline, etc. The intermediates of Formula II can be prepared by the methods described in Van Zandt and Brooker U. S. Patents 2,485,679 and 2,515,913.

The following examples will serve to illustrate the method of preparing the new ketones of our invention.

*Example 1.*—*2-benzoylmethylene-3-methyl-5-phenylbenzothiazoline*

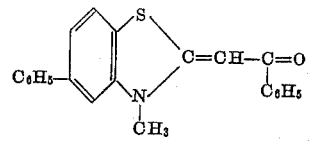

2,3-dimethyl - 5 - phenylbenzothiazolium p - toluenesulfonate (16.3 g., 1 mol.) was placed in a 500-ml. 3-necked flask fitted with a mechanical stirrer, dropping funnel, and water-cooled condenser. The quaternary salt was dissolved in pyridine (300 ml.), chilled with stirring in an ice bath, and treated dropwise with benzoyl chloride (5.5 g., 1 mol. + 25% excess). After the addition was complete, the reaction mixture was allowed to stand at room temperature for 15 minutes, heated on the steam bath one-half hour, and the pyridine removed under reduced pressure. The residue was then poured into water (2 liters) and allowed to stand overnight, the water decanted, and the residue stirred with methyl alcohol (50 ml.) until crystalline. The alcoholic solution was chilled and the product filtered off and dried. After one recrystallization from methyl alcohol, the yield of purified product was 6 g. (47%), M. P. 225°–226° C. with decomposition.

*Example 2.*—*2-benzoylmethylene-3-ethyl-5-phenylbenzothiazoline*

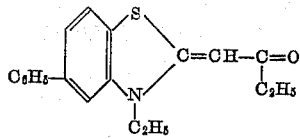

3-ethyl - 2 - methyl-5-phenylbenzothiazolium p-toluenesulfonate (14 g., 1 mol.) was placed in a 500-ml. 3-necked flask fitted with a mechanical stirrer, dropping funnel, and water-cooled condenser. The quaternary salt was dissolved in pyridine (250 ml.), chilled with stirring in an ice bath, and treated dropwise with benzoyl chloride (5.8 g., 1 mol. + 20% excess). After the addition was complete, the reaction mixture was allowed to stand at room temperature for 15 minutes, heated on steam bath one-half hour, and the pyridine removed under reduced pressure. The residue was then poured into water (2 liters) and allowed to stand overnight. The water was decanted and the residue extracted with ligroin. The ligroin solution was chilled and the product filtered off and dried. After one recrystallization from methyl alcohol, the yield of purified product was 5 g. (41%), M. P. 153°–154° C. with decomposition.

*Example 3.*—*2-benzoylmethylene-3-methyl-4-phenylbenzothiazoline*

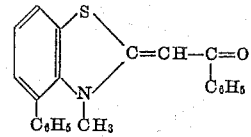

This ketone was obtained in the same manner as the ketones of Examples 1 and 2, except that after the benzoyl chloride was added, a small amount of triethylamine was added as an acid-binding agent. The purified yield was 41% and M. P. was 186–7° C. with decomposition.

Example 4.—2-benzoylmethylene-3-methyl-6-phenylbenzothiazoline

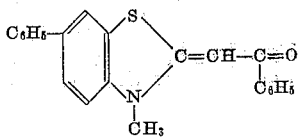

This ketone was obtained in the same manner as the ketones of Examples 1 and 2, except that after the benzoyl chloride was added, a small amount of triethylamine was added as an acid-binding agent. The purified yield was 48% and M. P. was 223–4° C. with decomposition.

Example 5.—2-benzoylmethylene-3-ethyl-6-phenylbenzothiazoline

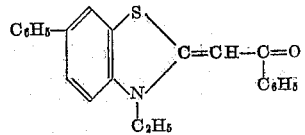

This ketone was obtained in the same manner as the ketones of Examples 1 and 2, except that after the benzoyl chloride was added, a small amount of triethylamine was added as an acid-binding agent. The purified yield was 32% and M. P. was 193–4° C. with decomposition.

Carbocyanine dyes containing a meso-aryl group can be prepared from the new ketones of our invention by first heating together a compound selected from those represented by Formula I above with a phosphorus oxyhalide, e. g. phosphorus oxychloride, and condensing the halide compound thus formed with a cyclammonium quaternary salt containing a reactive methyl group (e. g. a compound selected from those represented by Formula II above) in the presence of a basic condensing agent, e. g. triethylamine. The following examples will illustrate this method.

Example 6.—3,3'-dimethyl-5,5',9-triphenylthiacarbocyanine p-toluenesulfonate

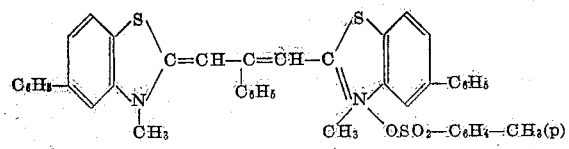

2-Benzoylmethylene-3-methyl-5-phenylbenzothiazoline (1.72 g., 1 mol.) was dissolved in dry benzene (50 ml.), phosphorus oxychloride (1.55 g., 2 mols.) was added and the mixture heated under reflux for 30 minutes. The reaction mixture was chilled and treated with ether (100 ml.) and the solid filtered off. The solid was dissolved in ethyl alcohol (20 ml.) and 2,3-dimethyl-5-phenylbenzothiazolium p-toluenesulfonate (2.06 g., 1 mol.) and triethylamine (2.1 ml., 2 mols.) was added and the reaction mixture refluxed 10 minutes. The reaction mixture was chilled and the crude dye filtered off and dried. After two recrystallizations from acetic acid, the yield of purified dye was 0.5 g. (14.3%), M. P. 272°–273° C. with decomposition. This dye sensitized a photographic gelatino-silver-bromiodide emulsion from about 540 mμ with maximum sensitivity at about 640 mμ.

Example 7.—3-ethyl-3'-methyl-5,5',9-triphenylthiacarbocyanine p-toluenesulfonate

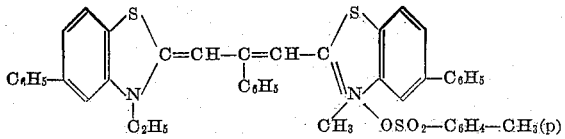

2-benzoylmethylene-3-ethyl-5-phenylbenzothiazoline (1.79 g., 1 mol.) was dissolved in dry benzene (30 ml.), phosphorous oxychloride (1.55 g., 2 mols.) was added and the mixture heated under reflux for 30 minutes. The reaction mixture was chilled and treated with ether (100 ml.) and the solid filtered off. The solid was dissolved in ethyl alcohol (20 ml.) and 2,3-dimethyl-5-phenyl benzothiazolium p-toluenesulfonate (2.06 g., 1 mol.) and triethylamine (2.1 ml., 2 mols.) was added and the reaction mixture refluxed 10 minutes. The reaction mixture was chilled and the crude dye filtered off and dried. After two recrystallizations from acetic acid, the yield of the purified dye was 1.0 g. (27.4%), M. P. 283°–284° C. with decomposition. This dye sensitized a photographic gelatino-silver-bromiodide emulsion from about 530 mμ to 655 mμ with a maximum sensitivity at about 630 mμ.

Example 8.—3,3'-diethyl-5,5',9-triphenylthiacarbocyanine p-toluenesulfonate

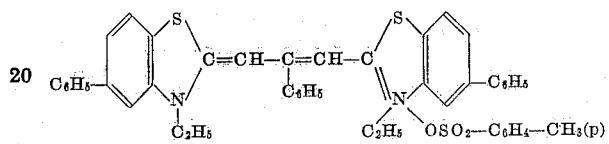

2-benzoylmethylene-3-ethyl-5-phenylbenzothiazoline (1.79 g., 1 mol.) was dissolved in dry benzene (30 ml.), phosphorous oxychloride (1.55 g., 2 mols.) was added and the mixture heated under reflux 30 minutes. The reaction mixture was chilled and treated with ether (100 ml.) and the solid filtered off. The solid was dissolved in ethyl alcohol (20 ml.) and 3-ethyl-2-methyl-5-phenyl benzothiazolium p-toluenesulfonate (2.12 g., 1 mol.) and triethylamine (2.1 ml., 2 mols.) was added and the reaction mixture refluxed 10 minutes. The reaction mixture was chilled and the crude dye filtered off and dried. After two recrystallizations from methyl alcohol, the yield of the purified dye was 1.6 g. (43%), M. P. 290°–291° C. with decomposition. This dye sensitized a photographic gelatino-silver-bromiodide emulsion from about 520 mμ to 650 mμ with a maximum sensitivity at about 630 mμ.

In a manner similar to that illustrated in Examples 6–8, other carbocyanine dyes can be obtained from the intermediates of Formula I.

As shown in Examples 6–8, the carbocyanine dyes obtained from our new ketone compounds are useful in spectrally sensitizing photographic silver halide emulsions when incorporated therein. The dyes are especially useful for extending the spectral sensitivity of the customarily employed gelatino-silver-chloride, gelatino-silver-chlorobromide, gelatino-silver-bromide, gelatino-silver-bromiodide, and gelatino-silver-chlorobromiodide developing-out emulsions. To prepare emulsions sensitized with one or more of these dyes, it is only necessary to disperse the dye or dyes in the emulsions. The methods of incorporating dyes in emulsions are simple and are known to those skilled in the art. In practice, it is convenient to add the dyes to the emulsions in the form of a solution in an appropriate solvent. Pyridine or methanol has proved satisfactory as a solvent for most of these dyes. The dyes are advantageously incorporated in the finished, washed emulsions and should be uniformly distributed throughout the emulsions.

The concentration of the dyes in the emulsions can vary widely, e. g. from 5 to 100 mg. per liter of flowable emulsion. The concentration of the dyes will vary according to the type of emulsion and according to the effect desired. The suitable and most economical concentration for any given emulsion will be apparent to those skilled in the art, upon making the ordinary tests and observations customarily used in the art of emulsion making. To prepare a gelatino-silver-halide emulsion sensitized with one or more of these dyes, the following procedure is satisfactory:

A quantity of dye is dissolved in pyridine or methanol (or a mixture of methanol and pyridine) and a volume of this solution, which may be diluted with water, containing from 5 to 100 mg. of dye, is slowly added to about 1000 cc. of gelatino-silver-halide emulsion, with stirring. Stirring is continued until the dye is thoroughly dispersed in the emulsion.

With most of these dyes, from 10 to 20 mg. of dye per liter of gelatino-silver-bromide or bromiodide emulsion (containing about 40 g. of silver halide) suffices to produce the maximum sensitizing effect. With the finer grain emulsions, somewhat larger concentration of dye may be needed to produce the maximum sensitizing effect.

The above statements are only illustrative, as it will be apparent that the dyes can be incorporated in photographic emulsions by any of the other methods customarily employed in the art, e. g. by bathing a plate or film upon which an emulsion is coated in a solution of the dye in an appropriate solvent. However, bathing methods are ordinarily not to be preferred. Emulsions sensitized with the dyes can be coated on suitable supports, such as glass, cellulose derivative film, resin film or paper in the usual manner.

Photographic silver halide emulsions, such as those listed above, containing the sensitizing dyes of our invention can also contain such addenda as chemical sensitizers (e. g. sulfur sensitizers, such as allyl thiocarbamide, thiourea, allylisothiocyanate, cystine, etc.), various gold compounds, such as potassium chloroaurate, auric trichloride, etc. (see U. S. Patents 2,540,085; 2,597,856; and 2,597,915, for example), various palladium compounds (such as palladium chloride (U. S. 2,540,086), potassium chloropalladate (U. S. 2,598,079), etc.,) etc., or mixtures of such sensitizers, antifoggants (e. g., benzotriazole, nitrobenzimidazole, 5-nitroindazole, etc. (see Mees—"The Theory of the Photographic Process," Macmillan Pub. (1942), pg. 460), or mixtures thereof), hardeners (e. g. formaldehyde (U. S. 1,763,533), chrome alum (U. S. 1,763,533), glyoxal (Ger. 538,713), dibromacrolein (Br. 406,750), etc.), color couplers, (e. g. such as those described in U. S. Patent 2,423,730, Spence and Carroll U. S. Patent 2,640,776, etc.), or mixtures of such addenda. Dispersing agents for color couplers, such as substantially water-insoluble, high boiling crystalloidal materials, such as those set forth in U. S. Patents 2,322,027 and 2,304,940, can also be employed in the above-described emulsions.

The following example will serve to illustrate the method of preparing intermediates represented by Formula II above.

*Example 9.—3-ethyl-2-methyl-6-phenylbenzothiazolium p-toluenesulfonate*

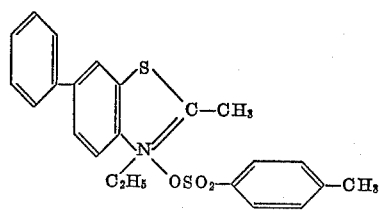

A mixture of 300 g. (1 mol.) of 4-aminobiphenyl hydrochloride and 1115 ml. of sulfur monochloride was placed in a 5-liter round-bottomed Pyrex flask, which was fitted with a stirrer and reflux condenser. The reaction mixture was gradually heated to 75° C. and then heating and stirring were continued for 4 hours. After chilling the reddish mixture, the solid 6-phenylbenzo-1,3-thiaza-2-thionium chloride was collected on a filter and then washed with benzene.

The product isolated above was added to a mixture of 2180 ml. of methyl alcohol, 1100 ml. of water, and 730 g. of 40 percent aqueous sodium hydroxide in a 5-liter 3-necked round-bottomed Pyrex flask, which was fitted with a stirrer and reflux condenser. As the solution was stirred, 365 g. of sodium hydrosulfite was added slowly over a period of about 30 minutes. The reaction mixture was heated at the temperature of the steam bath for about 2 hours and then filtered. The hot filtrate was stirred and treated with 182.5 g. of zinc chloride. The zinc double salt of 2-amino-5-phenylthiophenol was collected on a filter and washed with a little water. The solid was suspended in 500 ml. of benzene and the suspension was heated at the refluxing temperature. A water take-off was inserted between the neck of the flask and the condenser. When the benzene in the flask was dry, the remaining suspension was treated with 126 g. of acetyl chloride and the reaction mixture was heated at the refluxing temperature for 30 minutes. After cooling, the mixture was made alkaline with 10 percent sodium hydroxide and the benzene layer containing the 2-methyl-6-phenylbenzothiazole was isolated. The remaining aqueous layer was extracted with benzene; this extract was added to the main fraction. The combined benzene-base portion was dried over magnesium sulfate, filtered, and the benzene removed by distillation. The residue was extracted with hot ligroin (B. P. 90–120° C.). The solid obtained by chilling the ligroin extract was distilled, B. P. 194–197° C. at 2 mm. and after recrystallizing this distillate from ligroin, the almost colorless crystals of 2-methyl-6-phenylbenzothiazole melted at 132–133° C. The above method is similar to that of Herz.

A mixture of 11.25 g. (1 mol.) of 2-methyl-6-phenylbenzothiazole and 11.0 g. (1 mol. plus 10 percent) of ethyl p-toluenesulfonate was heated at the temperature of the steam bath for about 3 days. The cake of quaternary salt was broken up, ground to a mass of small crystals, and then washed with acetone. A specimen was recrystallized from ethyl alcohol. The almost colorless crystals melted at 85–86° C.

What we claim as our invention and desire secured by Letters Patent of the United States is:

1. A compound selected from those represented by the following general formula:

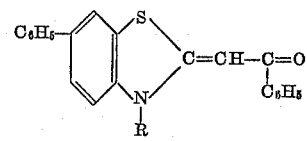

wherein R represents a primary alkyl group containing from 1 to 2 carbon atoms.

2. The compound having the following formula:

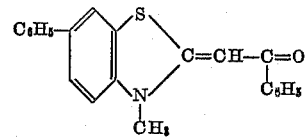

3. The compound having the following formula:

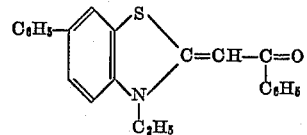

References Cited in the file of this patent

UNITED STATES PATENTS

| | | |
|---|---|---|
| 2,068,047 | Zeh et al. | Jan. 19, 1937 |
| 2,112,139 | Brooker et al. | Mar. 22, 1938 |
| 2,369,647 | Brooker et al. | Feb. 20, 1945 |
| 2,500,126 | Keyes | Mar. 7, 1950 |

FOREIGN PATENTS

| | | |
|---|---|---|
| 474,583 | Canada | June 19, 1951 |
| 877,225 | France | Dec. 1, 1942 |
| 994,163 | France | Aug. 3, 1951 |

OTHER REFERENCES

Levkoev et al.: Chem. Abst., vol. 41, col. 4814 (1947).